3,378,685
INFRARED NONDESTRUCTIVE TESTING TECHNIQUE INDEPENDENT OF SAMPLE SURFACE EMISSIVITY
Donald R. Green and Hugo L. Libby, Richland, Wash., assignors to the United States of America as represented by the United States Atomic Energy Commission
Filed May 20, 1965, Ser. No. 457,538
9 Claims. (Cl. 250—83.3)

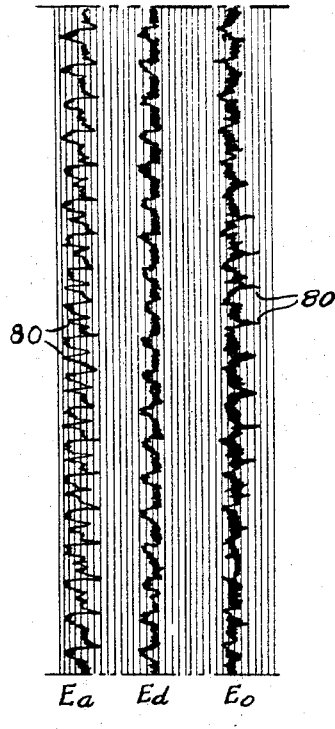
$F_{i}g-4A$
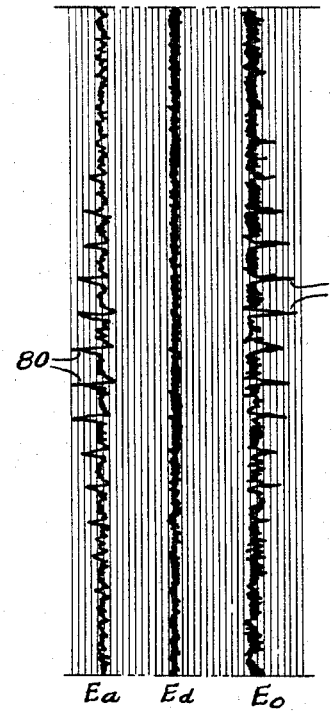
$F_{i}g-4B$
INVENTORS
Donald R. Green
Hugo L. Libby
BY
Roland G. Anderson
Attorney

United States Patent Office 3,378,685
Patented Apr. 16, 1968

ABSTRACT OF THE DISCLOSURE

A sample is nondestructively tested by heating a surface portion thereof and sequentially scanning the heated surface portion with two cooled infrared detectors mounted a predetermined distance apart. The output from the first infrared detector is delayed to be coincident in time with the output from the second infrared detector. The ratio of the delayed output of the first infrared detector with respect to the ouput from the second infrared detector is measured to obtain a signal characteristic of the surface heat of said test sample and independent of surface emissivity.

Contractual origin of the invention

The invention described herein was made in the course of, or under, a contract with the U.S. Atomic Energy Commission.

This invention relates to infrared nondestructive testing techniques and more particularly to an infrared nondestructive testing technique which is independent of sample emissivity.

Infrared nondestructive testing plays an important role in the nondestructive inspection of various materials. Some examples of the application of infrared nondestructive testing are testing for separation between the liner and case of rockets, for flaws that cause temperature rises in circuits and microcircuits, for voids in steel ingots as they come out of the rolls in a steel mill, for separations between laminations in plywood, and for testing the effects of irradiation on thermal quality in bonds in nuclear fuel elements. In infrared nondestructive testing, heat is applied to the outer surface of a test sample and flows inward. Differences in internal test piece characteristics affect the flow of the heat and cause differences in the surface temperature of the sample. These temperature differences are detected with an infrared detector. One problem which arises in infrared nondestructive testing is that the output of the infrared detector is a sensitive indication of both the temperature and surface emissivity of the test sample. It is desirable from a test viewpoint that the output of the infrared detector be sensitive to the temperature but not to the surface emissivity of the test sample.

Accordingly, it is one object of the present invention to provide a nondestructive method of infrared testing which is responsive to test sample surface temperature and independent of test sample surface emissivity.

Other objects of the present invention will become more apparent as the detailed description proceeds.

In general, the method of the present invention comprises heating a surface portion of a test sample, scanning said heated surface portion with a first infrared detector, and scanning said heated surface portion of said test sample with a second infrared detector a predetermined time after scanning said heated surface portion with said first infrared detector. The output from the first infrared detector is delayed so that it is coincident in time with the output from the second infrared detector. The ratio of delayed output of the first infrared detector with respect to the output from the second infrared detector is measured to obtain a signal which is characteristic of the surface heat of said test sample and independent of surface emissivity.

Further understanding of the present invention may best be obtained from consideration of the accompanying drawings wherein:

FIG. 3 is a detailed schematic diagram of a ratio circuit for the apparatus of FIG. 2.

FIG. 4A is a display of oscillograph tracings for a fuel element having a tempera paint coating thereon and tested according to the method of the present invention.

FIG. 4B is a display of oscillograph tracings for a fuel element without a tempera paint coating thereon and tested according to the method of the present invention.

Figure 1:
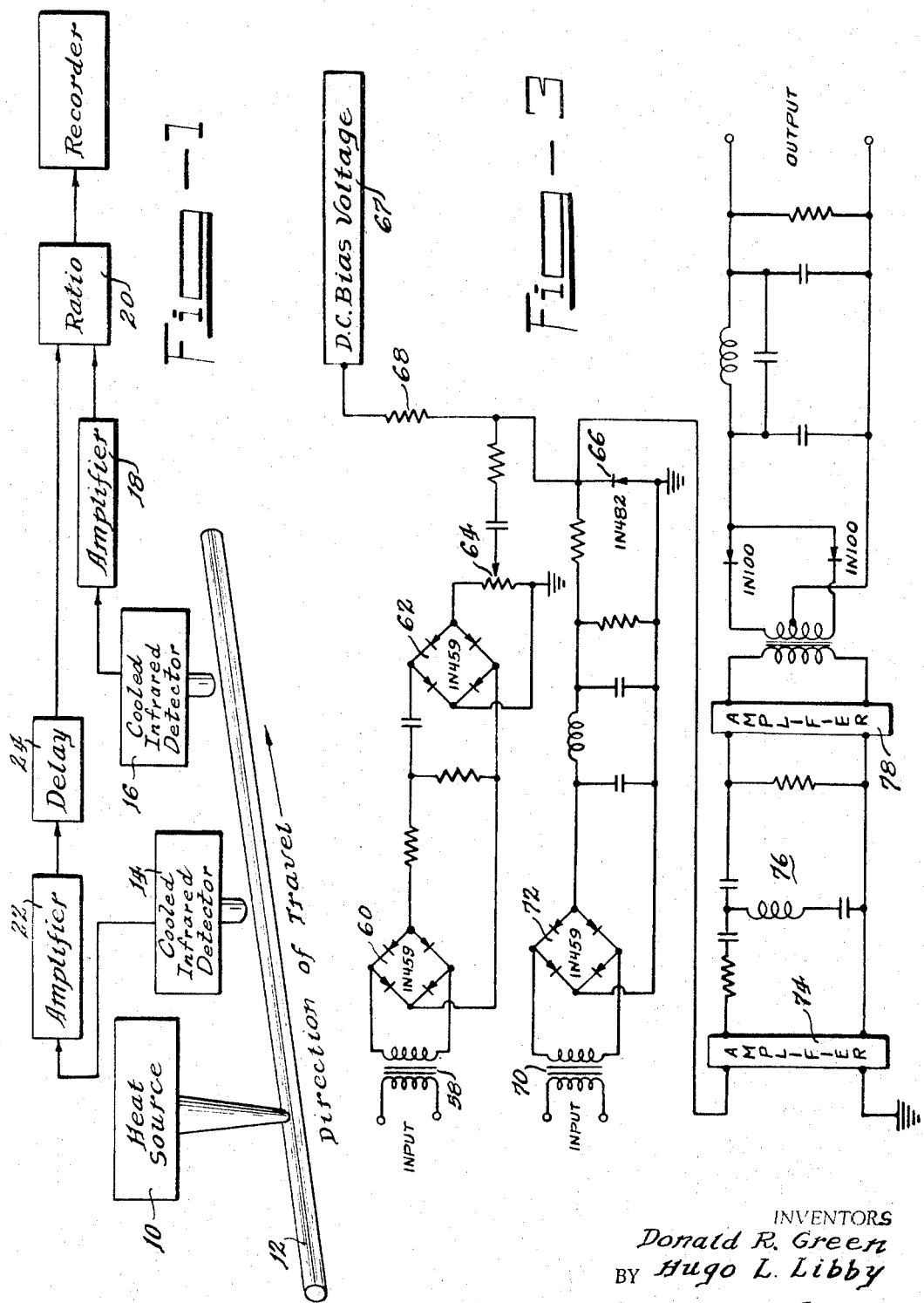
FIG. 1 is a schematic diagram of an apparatus for the practice of the basic method according to the present invention.

FIG. 1 illustrates an apparatus for the practice of the basic method of the present invention. A heat source 10 is used to heat a small portion of the surface of a test sample 12. Two infrared detectors 14 and 16 are positioned so that they view the heated surface portion of the test sample 12 at two different times after it has been heated by heat source 10. The sample 12 is moved with respect to the heat source 10 and infrared detectors 14 and 16 at a constant rate by a suitable prime mover, such as a lathe. The output from infrared detector 16 is amplified by an amplifier 18 and fed to the input of a ratio circuit 20. The output of infrared detector 14 is amplified by amplifier 22, delayed by a variable delay circuit 24 and fed to the other input of ratio circuit 20. The amount of delay occasioned the output signal of infrared detector 14 is such that the signal arrives at the input to the ratio circuit 20 coincident in time with the output from infrared detector 16. The ratio circuit 20 divides the output from infrared detector 16 into the output of detector 14 to give an output signal which is independent of surface emissivity of test sample 12 but responsive to the surface temperature thereof.

Further understanding of the method described supra may be obtained by considering the heat flow behavior. Immediately after an area on sample 12 passes under the heat source 10, the inward diffusion of heat causes the surface temperature of the area to drop. Since the impedance to inward flow of heat through a defect in sample 12 is greater than that through the sound regions thereof, the surface temperature near a defect is higher at a finite time $T_1$ after heating than near a sound region. The infrared detector 14 views the surface of test sample 12 at this time. Some time after time $T_1$, at time $T_2$, heat initially stored in the heat capacitance of the test sample 12 near the outer surface thereof becomes depleted by diffusion into the interior of the test sample 12 and the inward flow of heat becomes so small that temperature differences over subsurface defects are too small to be detected by an infrared detector. Infrared detector 16 views the surface of test sample 12 at this time. In this near equilibrium condition, the temperature of test sample 12 is above room temperature and infrared power emitted by it depends on the surface emissivity. The output of the infrared detector 16 is thus a function of temperature and emissivity but is not affected by defects in the sample 12.

It is to be noted that in positioning infrared detector 14 with respect to the test sample 12, the time required for a surface point to arrive within the field of view of the infrared detector 14 after passing under the heat source 10 must be greater than the time required for heat to flow from the outer surface to an internal defect in sample 12. Otherwise, the internal defect in sample 12 can have no influence on surface temperatures viewed by infrared detector 14. It is to be further noted that infrared detector 16 must be positioned such that the time required for a particular point on the surface of the test sample 12 to travel from infrared detector 14 to infrared detector 16 is greater than the duration of surface temperature differences resulting from defects of interest within the sample 12. By so positioning infrared detector 16, partial cancellation of the signal output by the ratio circuit 20 will be avoided. However, the temperature of the sample 12 under the infrared detector 16 should be as large as possible to increase the total signal-to-noise ratio, thus requiring the shortest travel time possible. In practice, infrared detector 16 is positioned so that the travel time of a surface point on sample 12 between the infrared detectors 14 and 16 is equal to the time required for temperature differences to decay over small subsurface defects. Temperature differences over large subsurface defects can have long decay times, but they are large enough that the elimination of emissivity effects is not necessary for their detection.

It is to be understood that the infrared detectors 14 and 16, for successful operation of the method according to FIG. 1, should be subcooled to approximately liquid nitrogen temperatures, whereby correction for the spectral emissive power thereof as hereinafter described is not requisite.

Figure 2:
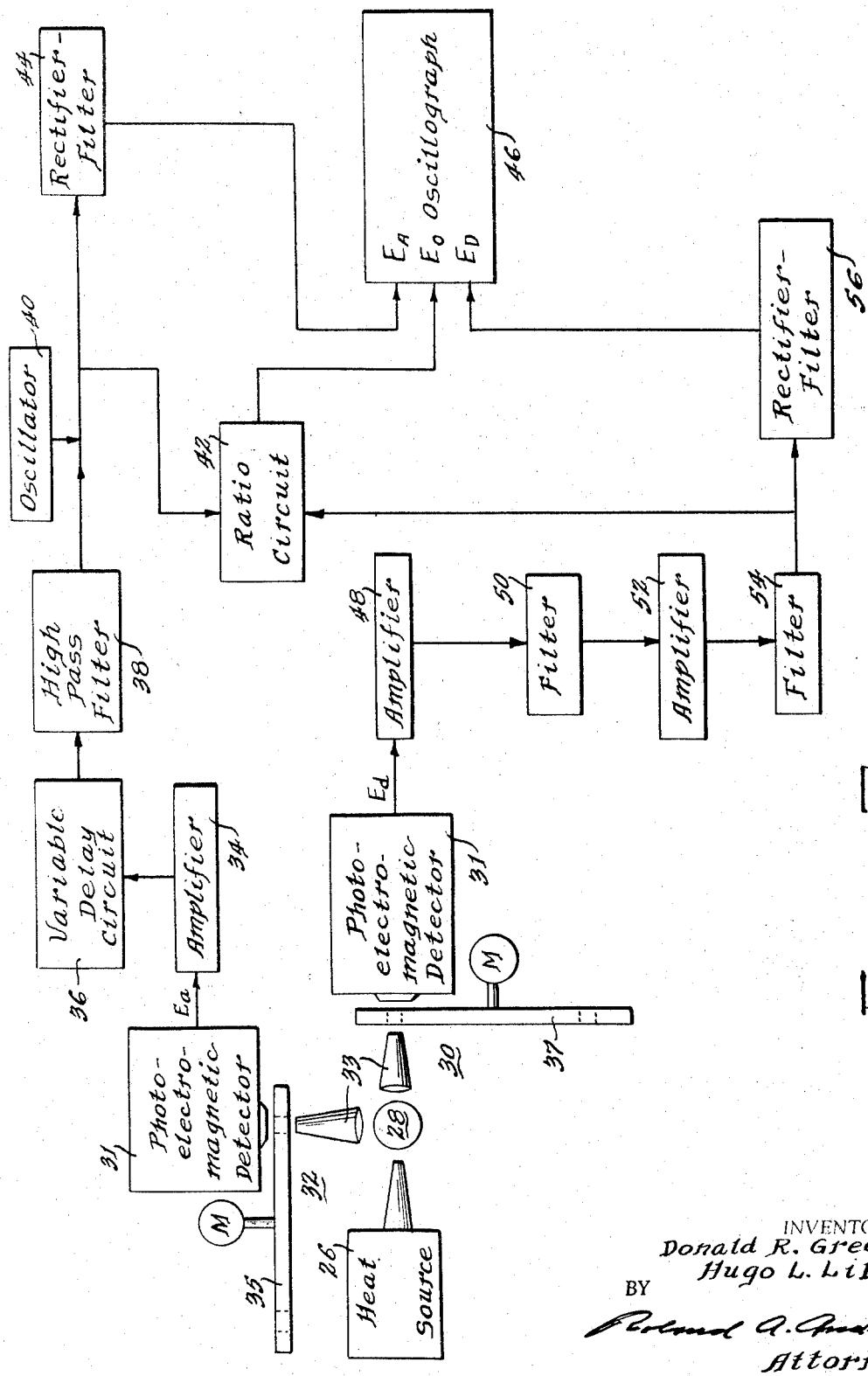
FIG. 2 is a schematic diagram of an apparatus for the practice of a method according to the present invention.

Reference is now made to FIG. 2 wherein is shown a schematic diagram of an apparatus for the further practice of the method according to the present invention. In FIG. 2, a heat source 26 is used to heat a small portion of a test sample 28. The test sample 28 is mounted in a prime mover, such as a lathe, so that the test sample passes the heat source 26 and heat is applied thereto in a helical path along the test sample. An infrared detector 30 is mounted 180 degrees around the test sample 28 from the heat source 26. A second infrared detector 32 is mounted 90 degrees around the test sample 28 from the heat source 26. It is to be understood, however, that it is not requisite for the present invention that the infrared detectors 30 and 32 be radially displaced about the test sample 28 or that the test sample 28 be moved so that heat is applied thereto in a helical path. The infrared detectors 30 and 32 are also displaced along the axial length of the test sample 28. The infrared detector 32 is positioned axially along the test piece 28 such that a given point on the surface of the test sample 28 arrives at the detector 32 approximately 25 milliseconds after passing under the middle of the heat source 26, the time of 25 milliseconds being equal to the time $T_1$ hereinbefore described for the method according to FIG. 1. The infrared detector 30 is axially positioned along test sample 28 such that a given point on the test sample surface arrives at detector 30 approximately one second after passing under detector 32, the mounting position corresponding to the time $T_2$ hereinbefore described for the method according to FIG. 1.

Indium antimonide photoelectromagnetic detectors 31 are used in the infrared detectors 30 and 32. Single germanium lenses 33 with ½ inch focal lengths and apertures of approximately one inch diameter are used to focus radiation from the test sample 28 into the photoelectromagnetic detectors. Lens barrels having ¼ inch apertures near the test piece surface are used to shield the optics from direct and first order radiation from the heat source. It has been found desirable to water-cool the lens barrel of detector 32 nearest the heat source 26. To facilitate manipulation of the output signals of the infrared detectors 30 and 32, motor-driven choppers 35 and 37 are inserted between the lenses and photoelectromagnetic detectors of the infrared detectors, whereby the infrared beams are interrupted at a 2000 c.p.s. rate. The electrical output from each of the detectors 30 and 32 is therefore a 2 kc. carrier having an amplitude that depends on the surface temperature and emissivity of the test sample 28.

The output from infrared detector 32, $E_a$, is amplified by an amplifier 34 and delayed by a variable time-delay circuit 36. After passing through the time-delay circuit 36, the voltage $E_a$ is again amplified and passed through a high pass filter 38 having a 700 c.p.s. cutoff frequency. A constant signal is then added from an oscillator 40 at approximately 18 kc. and the resultant fed into the numerator channel of a ratio circuit 42. The resultant is also fed into a rectifier and 1000 c.p.s. low pass filter 44 to convert it from the original sum of the 2 kc. amplitude modulated carrier and the 18 kc. constant signal to a demodulated DC to 1 KC signal. The output of the rectifier-filter 44 is then fed to the $E_a$ monitoring channel of an oscillograph 46. The output from the infrared detector 30, $E_d$, is amplified by amplifier 48 and then passed through a shunting parallel resonant filter 50 tuned to the 2 kc. chopper frequency. The filter 50 improves the signal-to-noise ratio of the infrared detector 30, since the temperature of the surface of the test sample 28 viewed by the detector 30 is lower than that viewed by infrared detector 32. The Q of the filter 50 is approximately 2 whereby the most important information frequencies contained in the $E_d$ signal are passed. The $E_d$ signal is amplified by amplifier 52 and passed through band pass filters 54 to more sharply attenuate signal frequencies below 500 c.p.s. and above 4000 c.p.s. The $E_d$ signal is then fed into a rectifier-filter 56 similar to rectifier-filter 44 and thence to the $E_d$ channel of oscillograph 46. The $E_d$ is also fed to the denominator of the ratio circuit 42. The ratio circuit divides $E_a$ by $E_d$ to give a signal output $E_o$ which is independent of surface emissivity of test sample 12 but responsive to the surface temperature thereof. The output of ratio circuit 42 is then fed to the $E_o$ channel of oscillograph 46.

The ratio circuit 42 is shown in detail in FIG. 3. The resultant of the 2 kc. amplitude modulated carrier $E_a$ and the constant 18 kc. signal is fed into isolation transformer 58. The $E_a$ signal is quadrupled in frequency by diode bridges 60 and 62 and high pass filters and applied together with the 18 kc. constant signal through an attenuation potentiometer 64 to the cathode of a 1N482 silicon diode 66. Current from a constant DC voltage bias 67 is also applied to the cathode of the diode 66 through a resistor 68. The bias voltage improves the accuracy of the ratio computed by the circuit, the optimum value of the bias being determined empirically.

The $E_d$ input to the ratio circuit is fed to isolation transformer 70 and then is rectified through diode bridge 72 and filtered to produce a DC to 1 kc. demodulated signal. The demodulated $E_d$ signal is then applied to the cathode of the 1N482 diode 66 where it influences the impedance of the diode 66 exponentially. This impedance variation operates on the amplitude of the $E_a$ signal at the cathode of the diode 66 to produce a ratio of the two signals $E_a$ and $E_d$. Ratio information from the diode 66 is in the form of an 8 kc. amplitude modulated carrier plus the 18 kc. constant signal and harmonics that have also been divided by $E_d$. The DC to 1 kc. $E_d$ signal appears both as a sum signal and as inverse amplitude modulation on both the 8 kc. carrier and the 18 kc. constant signal at this point. The signal is then amplified in amplifier 74 and a high pass filter 76 is used to remove the 0 to 1 kc. sum signal and obtain only the modulated 8 and 18 kc. signals. Upon further amplification by amplifier 78, the high-frequency signals are rectified and filtered to pass only the DC to 1 kc. modulation information which is the ratio signal hereinbefore described, $E_o$.

It is to be noted that the positioning of the infrared detectors 30 and 32 along the axis of the test sample 28 are guided by the same limitations as hereinbefore described for the method with respect to FIG. 1. However, for the method as just described for FIG. 2 it is to be noted that neither the infrared detectors 30 and 32 nor choppers 35 and 37 are sub-cooled to a temperature of approximately liquid nitrogen. By not so doing, it thereby is necessary that compensation be effected for the spectral emissive power of the plates of choppers 35 and 37 or any other reference source that is used. Further understanding of the requirement for this compensation will best be obtained by considering the infrared theory thereof.

All objects at temperatures above absolute emit infrared radiation. The spectral emissive power, $P_\lambda$, of a substance is given by Planck's equation as $$P_\lambda = \epsilon C_1 \lambda^{-5} [e^{C_2/\lambda T} - 1]^{-1} \quad (1)$$

where T is the absolute temperature, $C_1$ and $C_2$ are constants, $\lambda$ is the radiation wavelength, and $\epsilon$ is the spectral emissivity relative to a perfect black body. The radiation from a surface also varies in intensity as the cosine of the angle between the direction of observation and the normal to the surface (Lambert's cosine law). However, this angle is fixed at any instant for any given point on the test piece surface in the present case. The influence of differences in angle, therefore, is essentially the same as that of emissivity and is eliminated in the present method. For this reason, the effect of the angle is considered to be contained in the emissivity factor in the theory that follows.

The electrical signal from an infrared detector at any instant can be described as $$E = K_1 \int_0^\infty D_\lambda^* \epsilon C_1 \lambda^{-5} [e^{C_2/\lambda T} - 1]^{-1} \times d\lambda - K_2 \int_0^\infty D_\lambda^* \Delta_\lambda d\lambda = K_1 \epsilon f(T) - C \quad (2)$$

for a given infrared detector at a fixed position, where $C_1$, $C_2$, $C$, $K_1$, and $K_2$ are constants; $D_\lambda^*$ is the spectral detectivity of the detector; $\epsilon$ and T are the emissivity and temperature, respectively, of the surface being viewed by the detector; and $\Delta_\lambda$ is the spectral emissive power of the chopper blades or other reference source. The emissivity must be independent of wavelength and temperature so that it can be taken outside the integral.

The electrical outputs from the infrared detectors 30 and 32 as hereinbefore described are $E_a$ and $E_d$, respectively, during the time they are viewing the same increment of area on the surface of the test sample 28. It is to be noted that the same small section of surface is being viewed by both detectors 30 and 32 during the generation of $E_a$ and $E_d$. This is accomplished as hereinbefore described by delaying the output signal $E_a$ of detector 32 generated by a particular increment of surface area of the test sample 28 until that same area reaches detector 30 to give an $E_d$ output therefor. The instantaneous emissivity factor would not necessarily be the same in both infrared detector signal outputs if different area increments were viewed by the infrared detectors 30 and 32. It is to be noted that this condition as hereinbefore stated also exists for the method as described for FIG. 1. After suitable amplification as hereinbefore described for FIG. 2, constant signals from oscillators such as oscillator 40 can be added to the outputs of the infrared detectors 30 and 32 to cancel the constant infrared reference source contributions. Assuming that the two infrared detectors are identical (and they are so chosen for the practice of the present invention) and using Equation 2, it follows that the ratio of these sums would then result in $$[E_a + C]/[E_d + C] = f(T_a)/f(T_d) = E_n \quad (3)$$

where $T_a$ and $T_d$ are the absolute temperatures of the surface of the test sample 28 under the infrared detectors 32 and 30, respectively, and the required value of the constant C depends on the amount of amplification used. This ratio is independent of surface emissivity and varies only with the surface temperatures of test sample 28.

In utilizing the method of FIG. 2, it was found that it was not necessary to add a constant signal from an oscillator to the $E_d$ output of filter 54 as was necessary in the case of the $E_a$ channel. A constant infrared signal from the noncooled lens barrel on the $E_d$ infrared detector 30 added the proper amount of constant signal to compensate for the spectral emissive power of the chopper 37.

Using the method according to FIG. 2, cylindrical uranium-clad fuel elements were tested. The cylinders were approximately 1½ inches in diameter with a cladding thickness of 0.030 inch. A hot water autoclave was used to produce a thin oxide surface film on the cladding as a uniform surface condition prior to test. 0.003-inch thick mica disks ½ inch in diameter were emplaced in the core-to-cladding bonds to provide standard heat transfer defects. During the test these defects produced surface temperature differences which gave known signals that could be compared to signal variations caused by emissivity differences.

Reference is made to FIG. 4 wherein are shown infrared heat transfer maps produced by the aforementioned fuel elements with and without tempera painting on the surface thereof. FIG. 4a is the infrared heat transfer map of a fuel element with tempera painting and FIG. 4b of a fuel element without tempera painting, the tempera painting increasing the emissivity on a portion of the surface of the test sample. The heat transfer maps of FIG. 4 are oscillograph traces of signal amplitude vs. distance along the helical path described by the infrared detectors 30 and 32 on the fuel element surfaces. Trace deflections to the left represent increasing $E_a$ and $E_d$ and decreasing $E_o$. The spikes 80 on the traces $E_a$ and $E_o$ denote the presence of defects as represented by the mica disks. It is to be noted that the emissivity differences due to the tempera coating almost totally obscure these spikes in the uncompensated $E_a$ trace in FIG. 4A. Using the method of the present invention with the tempera coating, they are readily visible in the signal $E_o$.

It will be understood that in carrying out the method disclosed, cooling of the sample surface as, for instance by a cold gas jet, could be used instead of heating to produce surface temperature changes indicative of sample quality.

Persons skilled in the art will, of course, readily adapt the teachings of the present invention to methods other than the specific methods illustrated and described above. Accordingly, the scope of the protection afforded the invention is not intended to be limited to the particular methods shown in the drawings and described above but is to be determined only in accordance with the appended claims.

What is claimed is:

1. A method of infrared nondestructive testing independent of sample emissivity comprising heating a portion of the surface of said sample, scanning said heated surface portion of said sample with a first infrared detector cooled to a temperature of approximately liquid nitrogen, scanning said heated surface portion of said sample with a second infrared detector cooled to the temperature of approximately liquid nitrogen, delaying the output signal of said first infrared detector to cause the output signals of said first and second infrared detectors responsive to said heated surface portion of said sample to be coincident in time, and taking the ratio of the delayed output signal of said first infrared detector to the output signal of said second infrared detector, which ratio is responsive to the surface temperature of said sample but independent of the emissivity thereof.

2. The method according to claim 1 wherein scanning of said heated surface portion of said sample is effected by said first infrared detector at a time when heat from said heated surface portion has penetrated said sample to an internal defect therein.

3. The method according to claim 2 wherein scanning of said heated surface portion of said sample is effected by said second infrared detector at a time when the internal defect in said sample has an effect on the surface temperature of the heated surface portion of said sample that is undetectable by said second infrared detector.

4. A method of infrared nondestructive testing independent of sample emissivity comprising heating a portion of the surface of said sample, scanning said heated surface portion of said sample with a first infrared detector, scanning said heated surface portion of said sample with a second infrared detector, delaying the output signal of said first infrared detector to cause the output signals of said first and second infrared detectors responsive to said heated surface portion of said sample to be coincident in time, compensating the output signals of said first and second infrared detectors for contributions therein of the spectral emissive power of said first and second infrared detectors, and taking the ratio of the delayed-compensated output signal of said first infrared detector to the compensated output signal of said second infrared detector, which ratio is responsive to the surface temperature of said sample but independent of the emissivity thereof.

5. A method of infrared nondestructive testing independent of sample emissivity comprising heating a portion of the surface of said sample, scanning said heated surface portion of said sample with a first infrared detector, periodically interrupting with a chopper the scanning of said heated surface portion of said sample by said first infrared detector whereby said first infrared detector has an alternating frequency output, scanning said heated surface portion of said sample with a second infrared detector, periodically interrupting with a chopper the scanning of said heated surface portion of said sample by said second infrared detector whereby said second infrared detector has an alternating frequency output, delaying the output signal of said first infrared detector to cause the output signals of said first and second infrared detectors responsive to said heated surface portion of said sample to be coincident in time, compensating the output signals of said first and second infrared detectors for infrared reference source contributions therein, and taking the ratio of the compensated-delayed output signal of said first infrared detector to the compensated output signal of said second infrared detector, which ratio is responsive to the surface temperature of said sample but independent of the emissivity thereof.

6. The method according to claim 5 wherein scanning of said heated surface portion of said sample is effected by said first infrared detector at a time when heat from said heated surface portion has penetrated said sample to an internal defect therein.

7. The method according to claim 6 wherein scanning of said heated surface portion of said sample is effected by said second infrared detector at a time when the internal defect in said sample has an effect on the surface temperature of said heated surface portion of said sample that is undetectable by said second infrared detector.

8. A method of infrared nondestructive testing independent of sample emissivity comprising heating a portion of the surface of said sample, scanning said heated surface portion of said sample with a first infrared detector at a time approximately 25 milliseconds after the heating thereof, periodically interrupting with a chopper the scanning of said heated surface portion of said sample by said first infrared detector whereby said first infrared detector has an alternating frequency output, scanning said heated surface portion of said sample with a second infrared detector at a time approximately one second after the scanning thereof by said first infrared detector, periodically interrupting with a chopper the scanning of said heated surface portion of said sample by said second infrared detector whereby said second infrared detector has an alternating frequency output, delaying the output signal of said first infrared detector to cause the output signals of said first and second infrared detectors responsive to said heated surface portion of said sample to be coincident in time, compensating the output signals of said first and second infrared detectors for infrared reference source contributions therein, and taking the ratio of the compensated-delayed output signal of said first infrared detector to the compensated output signal of said second infrared detector, which ratio is responsive to the surface temperature of said sample but independent of the emissivity thereof.

9. A method of infrared nondestructive testing independent of sample emissivity comprising heating a portion of the surface of said sample, scanning said heated surface portion of said sample with a first infrared detector at a time approximately 25 milliseconds after the heating thereof, periodically interrupting with a chopper the scanning of said heated surface portion of said sample by said first infrared detector whereby said first infrared detector has an alternating frequency output, scanning said heated surface portion of said sample with a second infrared detector at a time approximately one second after the scanning thereof by said first infrared detector, periodically interrupting with a chopper the scanning of said heated surface portion of said sample by said second infrared detector whereby said second infrared detector has an output equal in frequency to the output of said first infrared detector, delaying the output signal of said first infrared detector to cause the output signals of said first and second infrared detectors responsive to said heated surface portion of said sample to be coincident in time, adding first and second constant oscillatory signals to the outputs of said first infrared detectors to compensate for infrared reference contributions therein, and taking the ratio of the compensated-delayed output signal of said first infrared detector to the compensated output signal of said second infrared detector, which ratio is responsive to the surface temperature of said sample but independent of the emissivity thereof.

References Cited
UNITED STATES PATENTS

| | | | |
|---|---|---|---|
| 3,044,297 | 7/1962 | Hanken | 250—83.3 X |
| 3,082,325 | 3/1963 | Speyer | 250—83.3 |
| 3,206,603 | 9/1965 | Mauro | 250—83.3 |

ARCHIE R. BORCHELT, *Primary Examiner.*